(12) United States Patent
Larson et al.

(10) Patent No.: US 7,043,396 B2
(45) Date of Patent: May 9, 2006

(54) METHODS FOR MEASURING ALIGNMENT IN CUSTOMIZED VEHICLES

(75) Inventors: Timothy A. Larson, Ferguson, MO (US); Dennis D. Bowen, St. Peters, MO (US); Michael T. Stieff, Wentzville, MO (US)

(73) Assignee: Hunter Engineering Company, Bridgeton, MO (US)

( * ) Notice: Subject to any disclaimer, the term of this patent is extended or adjusted under 35 U.S.C. 154(b) by 0 days.

(21) Appl. No.: 10/741,501

(22) Filed: Dec. 19, 2003

(65) Prior Publication Data

US 2005/0132587 A1    Jun. 23, 2005

(51) Int. Cl.
*G01C 9/00* (2006.01)
*G01B 11/275* (2006.01)
*G01B 5/24* (2006.01)

(52) U.S. Cl. .............. 702/151; 33/203.14; 33/203.18; 73/122; 73/146; 340/2.8; 340/442; 340/933; 701/36; 703/8; 702/94; 702/95; 702/150

(58) Field of Classification Search ............... 702/150, 702/151, 138, 105, 147, 94, 55; 33/203.18, 33/203.14; 701/33, 36, 300, 38, 70; 703/8; 700/279; 356/155, 139.09; 340/2.8, 443, 340/933; 73/122, 146
See application file for complete search history.

(56) References Cited

U.S. PATENT DOCUMENTS

| | | | | |
|---|---|---|---|---|
| 3,222,794 A | * | 12/1965 | MacMillan et al. ........... 33/336 |
| 4,807,128 A | * | 2/1989 | Ikemoto et al. .............. 701/38 |
| RE33,144 E | | 1/1990 | Hunter et al. |
| 5,386,639 A | * | 2/1995 | Colarelli et al. ......... 33/203.14 |
| 5,909,379 A | | 6/1999 | Dale, Jr. et al. |
| 5,913,240 A | * | 6/1999 | Drahne et al. ................ 73/146 |
| 6,047,594 A | * | 4/2000 | Kroll et al. ................... 73/122 |
| 6,594,566 B1 | * | 7/2003 | Skoff .......................... 701/36 |
| 6,799,376 B1 | * | 10/2004 | Voeller et al. ........... 33/203.18 |
| 6,822,582 B1 | * | 11/2004 | Voeller et al. .............. 340/933 |
| 6,861,942 B1 | * | 3/2005 | Knapp et al. ................ 340/2.8 |
| 2002/0120365 A1 | * | 8/2002 | Bokar ........................ 700/279 |
| 2004/0196148 A1 | * | 10/2004 | Albuquerque ............... 340/442 |

OTHER PUBLICATIONS

LONGACRE—Longacre Racing Products, Woodinville, WA—Instructions pamphlet—Jun., 1999—4 pages.

* cited by examiner

*Primary Examiner*—John Barlow
*Assistant Examiner*—John Le
(74) *Attorney, Agent, or Firm*—Polster, Lieder, Woodruff & Lucchesi, L.C.

(57) ABSTRACT

A method and apparatus for guiding an operator in the alignment of the wheels of an automotive vehicle which has been either modified from a original manufacturer configuration, or for which no previously established alignment settings are known. Initially, the operator identifies known information about the vehicle and selects a desired characteristic of the vehicle for which the vehicle alignment is to be optimized. A set of initial alignment settings are presented to the operator, based upon the selected characteristic for the vehicle, and the vehicle alignment is adjusted thereto. One or more subsequent measurements of the vehicle are acquired. Alignment adjustments to further improve the selected characteristic, identified in response to the vehicle measurements are presented to the operator. The process of alignment adjustment, measurement, and presented adjustments is repeated until an optimal alignment setting for the selected characteristic is reached.

27 Claims, 11 Drawing Sheets

RULE OF THUMB AND BASE VEHICLE

VEHICLE SPECIFICATIONS
FORD: FOCUS: 2002: WAGON: ALTERED: MAXIMIZE TIRE LIFE

| FRONT | SPEC. | TOL. |
|---|---|---|
| LEFT CAMBER | 0.2° | 1° |
| RIGHT CAMBER | 0.2° | 1° |
| CROSS CAMBER | | 1.25° |
| LEFT CASTER | 2.88° | 1.01° |
| RIGHT CASTER | 2.88° | 1.01° |
| CROSS CASTER | | 1.00° |
| TOTAL TOE | 0.00° | 0.25° |
| LEFT SAI | ° | ° |
| RIGHT SAI | ° | ° |
| CROSS SAI | | ° |

| REAR | | |
|---|---|---|
| LEFT CAMBER | -0.94° | 1.28° |
| RIGHT CAMBER | -0.94° | 1.28° |
| CROSS CAMBER | | 1.25° |
| TOTAL TOE | 0.50° | 0.20° |
| THRUST ANGLE | ° | |

ALTERED SPECS ARE DISPLAYED IN BLUE. ORIGINAL SPEC ARE IN BLACK.

| RECALL SPECIFICATIONS | SHOW SECONDARY SPECIFICATIONS | | MOUNT SENSORS |
|---|---|---|---|

THE SPEC SCREEN WILL DISPLAY THE ALIGNMENT SPECS THAT COMBINE THE BASE VEHICLE SPECS AND THE RULE OF THUMB SPECS.

THE SPECS ARE A COMBINATION OF THE "RULE OF THUMB" SPECS AND THE ORIGINAL "BASE" VEHICLE SPECS

SPECS FROM THE BASE VEHICLE ARE SHOWN IN BLACK.

SPECS FROM THE "RULE OF THUMB" SPEC ARE SHOWN IN BLUE.

ALTERED SPECS

VEHICLE SPECIFICATIONS
FORD: FOCUS: 2002: WAGON: ALTERED: MAXIMIZE TIRE LIFE

| FRONT | SPEC. | -TOL. | +TOL. |
|---|---|---|---|
| LEFT CAMBER | 0.00° | 0.75° | 0.75° |
| RIGHT CAMBER | 0.00° | 0.75° | 0.75° |
| CROSS CAMBER | | | |
| LEFT CASTER | 1.55° | 1.00° | 1.00° |
| RIGHT CASTER | 1.55° | 1.00° | 1.00° |
| CROSS CASTER | | | |
| TOTAL TOE | 0.00° | 0.24° | 0.24° |
| LEFT SAI | 0.50° | | |
| RIGHT SAI | -0.50° | | |
| CROSS SAI | 0.70° | | |
| REAR | | | |
| LEFT CAMBER | -0.75° | 0.75° | 0.75° |
| RIGHT CAMBER | -0.75° | 0.75° | 0.75° |
| CROSS CAMBER | | | |
| TOTAL TOE | 0.16° | 0.08° | 0.16° |
| THRUST ANGLE | | | |

ALTERED SPECS ARE DISPLAYED IN BLUE. ORIGINAL SPEC ARE IN GRAY.

[RECALL SPECIFICATIONS] [SHOW SECONDARY SPECIFICATIONS] [MOUNT SENSORS]

- IF THE TEMPERATURE READINGS INDICATE A NEED, THEN WINALIGN WILL COMPUTE NEW SPECS BASED ON THE TIRE TEMPERATURES.
- THE ORIGINAL SPEC IS SHOWN IN GRAY.
- THE ALTERED SPEC IS SHOWN IN BLUE.
- IF A SPEC IS NOT ALTERED IT REMAINS IN BLACK.

METHODS FOR MEASURING ALIGNMENT IN CUSTOMIZED VEHICLES

CROSS-REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates generally to methods and procedures for measuring and adjusting vehicle wheel alignment settings, such as caster, camber, and toe angles, and in particular, to methods and procedures for measuring and adjusting vehicle wheel alignment settings to provide a desired vehicle handling characteristic on vehicles configured with modified or altered suspension systems.

Conventional vehicle wheel alignment systems such as those manufactured and sold by Hunter Engineering Company of Bridgeton, Mo. generally consist of a set of sensors for acquiring measurements related to current vehicle wheel alignment angles, and a computer system configured with one or more software programs adapted for utilizing the acquired measurements to guide an operator to adjust components of the vehicle suspension system until the vehicle wheel alignment angles match one or more manufacturer's specifications. Conventional systems may include wheel-mounted alignment angle sensors, such as the DSP-500 sensors, or camera-based sensors, such as the DSP-600 sensors, both of which are manufactured and sold by Hunter Engineering Company. A conventional computer system configured with one or more vehicle wheel alignment software programs, and configured for use with the aforementioned sensors is the Hunter Engineering Series 811 wheel alignment console.

Adjustment of the components of a vehicle's suspension system to meet a vehicle manufacturer's specifications is suitable for the majority of vehicles undergoing an alignment adjustment procedure. However, if a vehicle's suspension system has been modified from the original manufacturer's design, such as through the use of suspension-lowering components, as is commonly found in modified or customized vehicles, the manufacturer's specifications may no longer be suitable for optimal performance nor optimal tire wear of the vehicle.

Accordingly, it would be advantageous to provide a vehicle wheel alignment system with methods and procedures for adjusting the alignment of modified or customized vehicles to meet one or more desired vehicle handling or performance characteristics.

BRIEF SUMMARY OF THE INVENTION

Briefly stated, the present invention provides a method for guiding an operator in the alignment of the wheels of an automotive vehicle which has been either modified from a original manufacturer configuration, or for which no previously established alignment settings are known. Initially, the operator identifies known information about the vehicle and selects a desired characteristic of the vehicle for which the vehicle alignment is to be optimized, i.e., handling or tire wear. A set of initial alignment settings are presented to the operator, based upon the selected characteristic for the vehicle, and the vehicle alignment is adjusted thereto. The vehicle is then driven on a road test in a predetermined manner associated with the selected characteristic, and one or more measurements of the vehicle are acquired. Subsequent alignment adjustments to further improve the selected characteristic, identified in response to the vehicle measurements are presented to the operator. The process of alignment adjustment, measurement, and presented adjustments is repeated until an optimal alignment setting for the selected characteristic is reached.

In an alternate embodiment of the present invention, a set of vehicle tire load distribution measurements are acquired and utilized to identify alignment adjustments used to improve a selected vehicle characteristic during the alignment process.

In an alternate embodiment of the present invention, a set of vehicle tire temperature distribution measurements are acquired after road testing of the vehicle, and utilized to identify alignment adjustments used to improve a selected vehicle characteristic during the alignment process.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Those of ordinary skill in the art will recognize that the methods of the present invention for alignment of a vehicle may be carried out on any of a variety of conventional vehicle wheel alignment systems having components configured to acquire vehicle wheel alignment measurements, to display such measurements to an operator, and to provide instructions and/or alignment values to an operator. Such instructions may include, but are not limited to, directions on how to alter the alignment of a vehicle component, representation of differences between current alignment measurements and desired alignment settings, or request for operator input. Preferably, the vehicle wheel alignment system includes a computer configured with a vehicle wheel alignment software program capable of receiving data, and which may be programmed to assist and/or guide an operator or technician in carrying out the methods of the present invention. Except as specifically identified herein, vehicle wheel alignment systems, vehicle wheel alignment software programs for acquiring wheel alignment angle measurements, alignment angle measurement components, and vehicle characteristic measurement components utilized to carry out the methods of the present invention are considered to be conventional, such as shown in U.S. Pat. No. 5,870,315 to January, and will not be further described herein.

Figure 1:
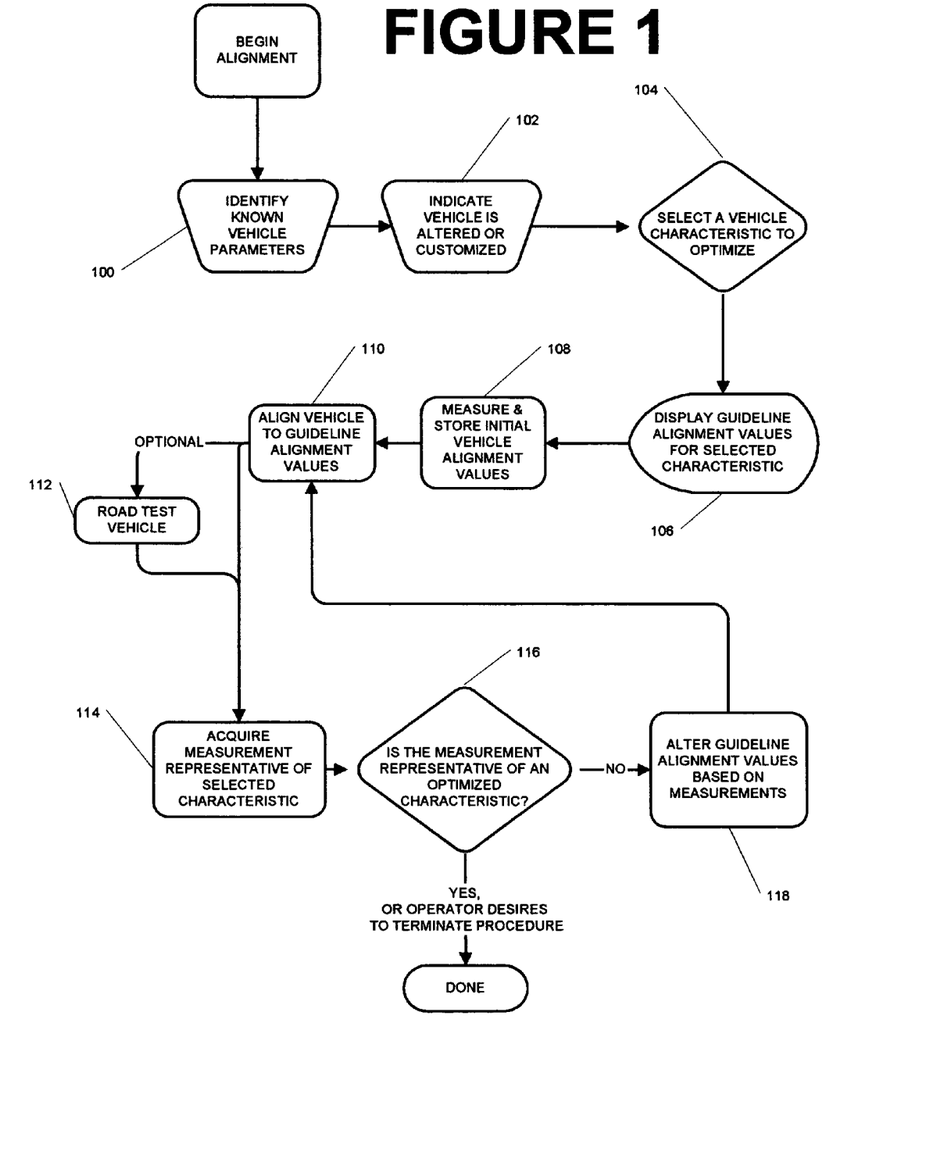
FIG. 1 is a flow chart of a preferred method of the present invention.

The preferred method for guiding an operator in the alignment of the wheels of an automotive vehicle which has been either modified from a original manufacturer configuration, or for which no previously established alignment settings are known is shown generally in FIG. 1. Initially, the operator identifies any known information about the vehicle (Box 100), identifies that the vehicle has been altered or customized (Box 102), and selects a desired characteristic of the vehicle for which the vehicle alignment is to be optimized (Box 104). In response, a set of initial alignment settings are presented to the operator (Box 106), based upon the selected characteristic for the vehicle and any known information about the vehicle. In the preferred embodiment, a "rule of thumb" set of initial guideline alignment settings for each desired characteristic are predetermined and stored.

Upon selection by the operator of the desired characteristic, the associated "rule of thumb" initial guideline alignment settings are recalled and optionally adjusted based on the known information about the vehicle, i.e., substituting a manufacturer's recommended alignment value for a blank or missing value in the "rule of thumb" initial guideline alignment settings. Those of ordinary skill in the art will recognize that in some applications, the "rule of thumb" initial guideline alignment settings may be identical to the manufacturer's recommended alignment values for an unaltered vehicle.

In an alternate embodiment of the present invention, the "rule of thumb" initial guideline alignment settings are a generated in response to one or more additional inputs provided by the operator or in response to the results of one or more preliminary measurements, as a modification of the manufacturer's recommended alignment values. For example, after initially identifying the selected characteristic for the vehicle and any known information about the vehicle, the operator may further provide one or more inputs or preliminary measurements related to modifications made to the vehicle, i.e., height of suspension lift, amount of suspension lowering, presence or absence of additional suspension altering components, tire and wheel sizes, and/or tire tread wear characteristics. Using the manufacturer's recommended alignment values, the selected characteristic for the vehicle, and the operator-provided information or preliminary measurements, such as tire wear characteristics, a set of "rule of thumb" guideline alignment settings are generated using predetermined information. For example, if the operator indicated the vehicle is to be aligned to improve tire wear, and the operator further identifies excessive tire wear indicative of a toe-out alignment condition, the "rule of thumb" guideline alignment settings may initially suggest altering only the manufacturer's recommended toe alignment angles.

After the "rule of thumb" guideline alignment settings are established, the vehicle is next configured for alignment angle adjustments, with initial measurements of the vehicle alignment taken and stored (Box 108). The vehicle alignment angles are adjusted to the initial guideline alignment settings presented to the operator (Box 110). Next, the vehicle is optionally driven on a road test (Box 112) in a predetermined manner associated with the selected characteristic, and one or more additional measurements of the vehicle which are related to the selected characteristic are acquired (Box 114). The additional measurements are reviewed to determine if additional alignment adjustments would further improve the selected characteristic (Box 116). If so, the subsequent alignment adjustments to further improve the selected characteristic are determined (Box 118), and are re-presented to the operator as altered guideline alignment values for adjustment (Box 110).

Preferably, the altered values re-presented to the operator as the altered guideline alignment values may be based in-part on one or more of the following parameters: the results of the one or more additional measurements; operator feedback; previous values of the guideline alignment values; and one or more predetermined rules or guidelines for alignment adjustment. For example, the results of the one or more additional measurements may provide an indication of the severity of a misalignment, the previous value of the guideline alignment values provides a starting point, and the one or more predetermined rules or guidelines may provide an indication, responsive to the severity, of how much to adjust the alignment value from the starting point.

The process of alignment adjustment (Box 110), optional road testing (Box 112), measurement (Box 114), and review (Box 116) is repeated until additional altered guideline alignment values (Box 118) are not required, indicating an optimal alignment setting for the selected characteristic has been reached, or the technician elects to terminate the alignment adjustment procedures.

Those of ordinary skill in the art will readily recognize that a conventional vehicle wheel alignment system configured with a programmable computer, a display, one or more input/output devices, at least one alignment angle sensor, and a vehicle wheel alignment software program may be readily adapted to assist an operator in performing the method of the present invention. Preferably, the vehicle wheel alignment software program is modified to include one or more additional sets of program instructions to guide an operator through the method, to generate the initial guideline alignment values, acquire the necessary measurements of the selected characteristics, and to alter the guideline alignment values. In essence, the guideline alignment values are substituted for manufacturer's recommended alignment values, providing a basis against which to compare actual alignment values of the vehicle, and to thereby determine necessary adjustments.

Figure 2:
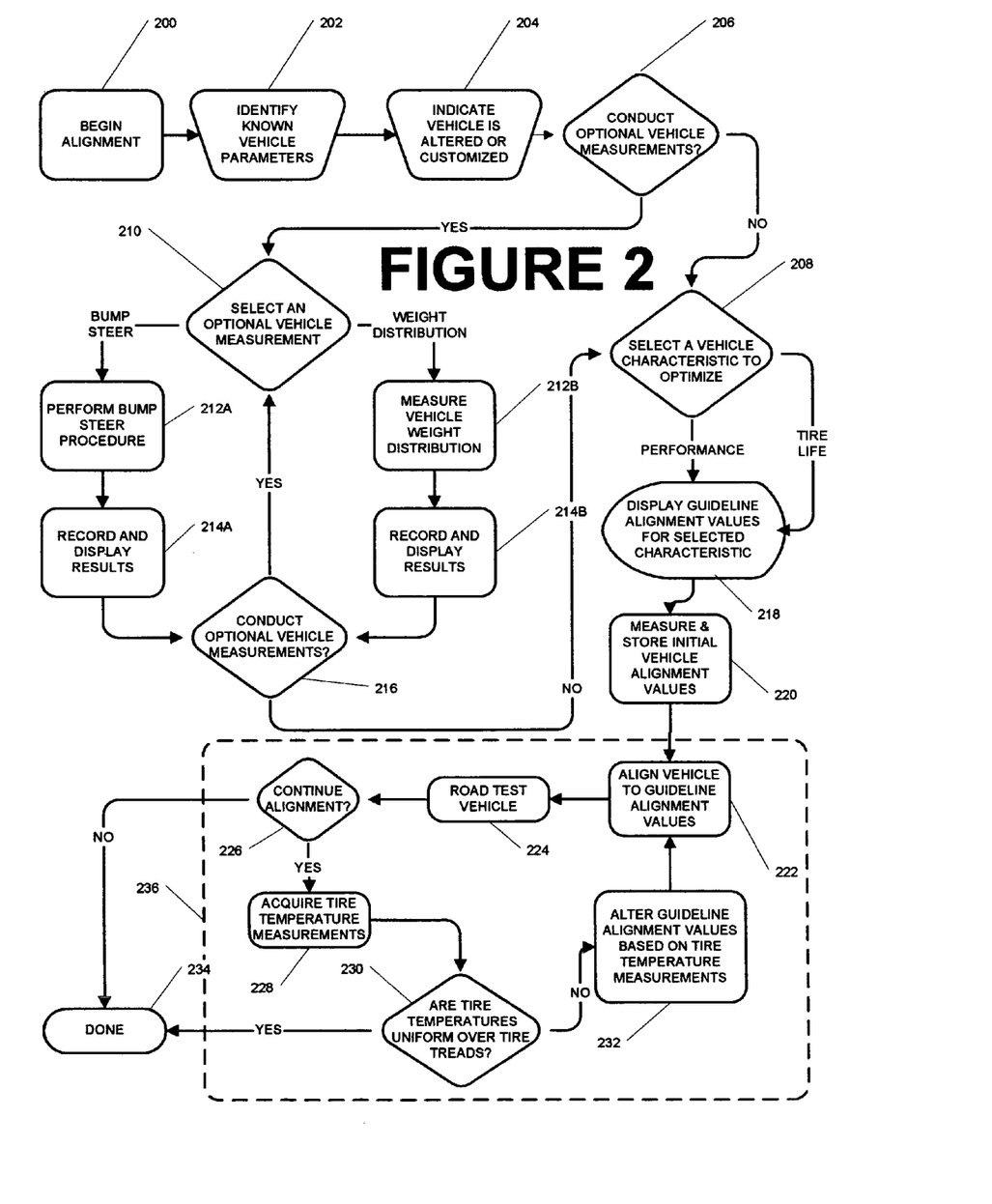
FIG. 2 is a flow chart of an alternate method of the present invention.

With reference to the flow chart of FIG. 2, an alternate method of the present invention begins in a conventional manner (Box 200), typically by disposing the vehicle undergoing the alignment in proximity to a vehicle wheel alignment system and initiating an alignment procedure on the vehicle wheel alignment system. During initiation of the alignment procedure, the operator optionally identifies to the vehicle wheel alignment system one or more known vehicle identifying parameters (Box 202) of the customized or altered vehicle undergoing the alignment procedure. Typically, an operator provides identifying information such as the vehicle make, model, and year data to the vehicle wheel alignment system, permitting the vehicle wheel alignment system to recall a set of stored manufacturer's alignment specifications from a database.

Figure 3:
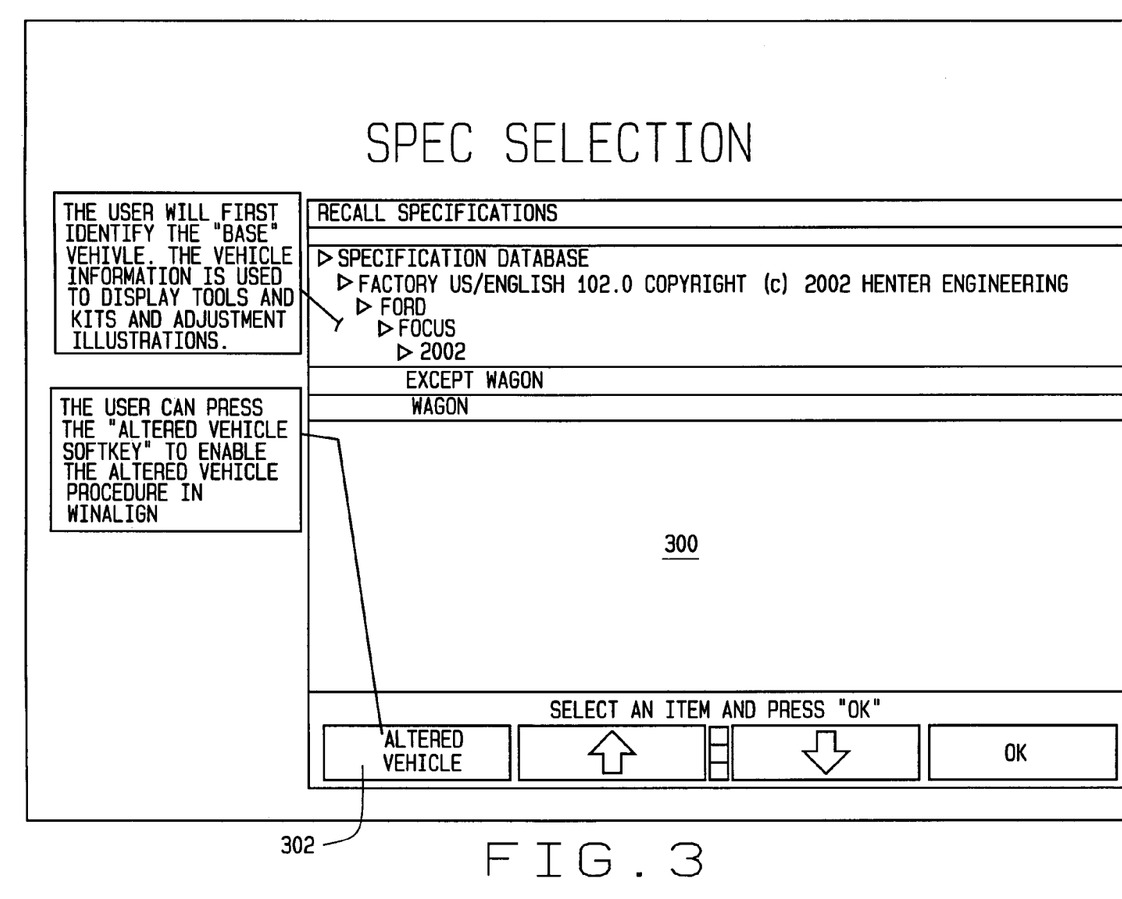
FIG. 3 is a representative display of a vehicle identification screen.

With the method of the present invention, the operator is further required to identify that the vehicle has been altered or customized (Box 204). Preferably, as shown in FIG. 3, the vehicle wheel alignment system display 300 is configured to provide an operator with a selection button 302 to indicate to the vehicle wheel alignment system that the selected vehicle has been altered or customized.

Figure 4:
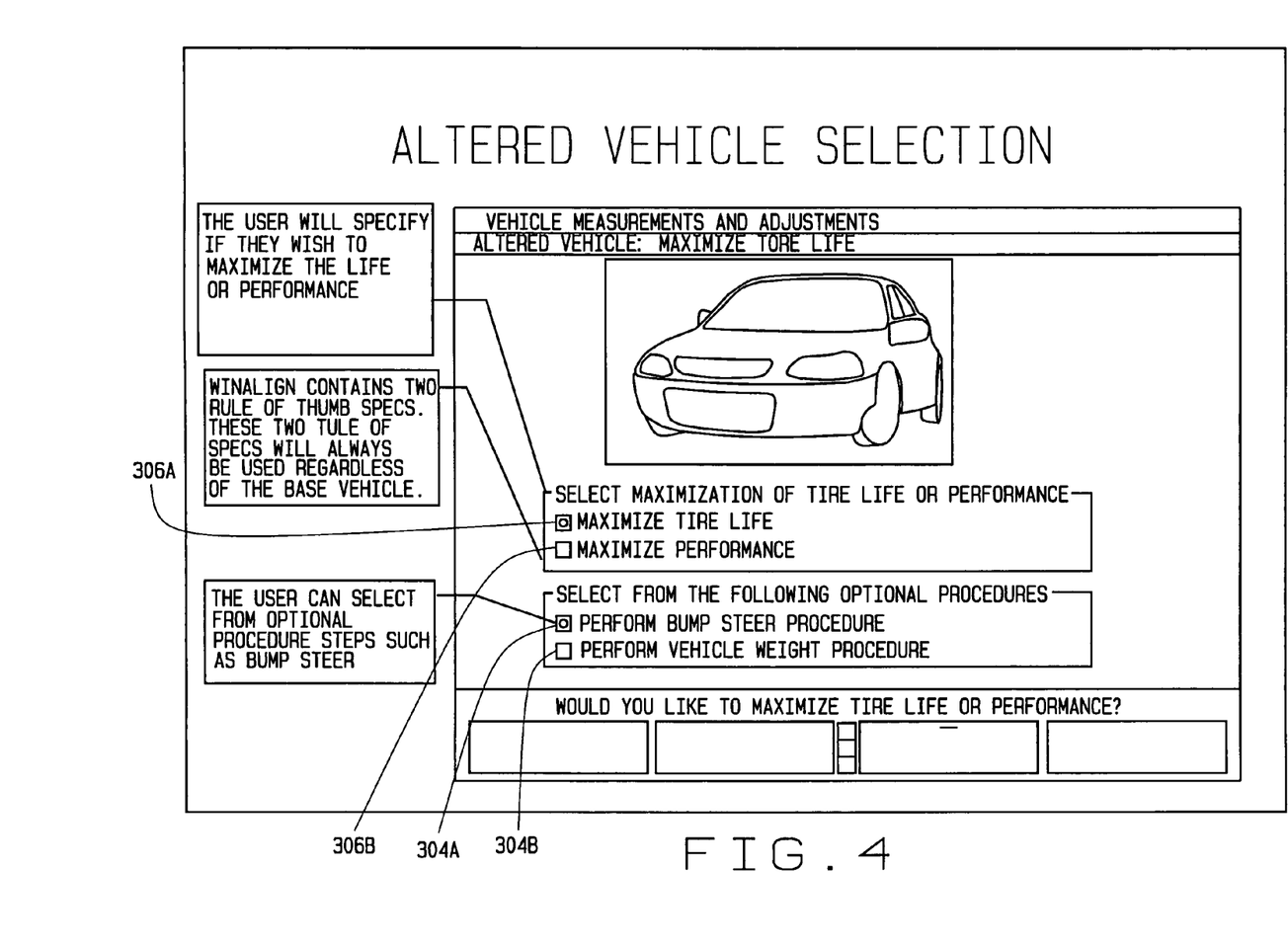
FIG. 4 is a representative display of a vehicle characteristic selection and optional measurement selection screen.

Upon indicating to the vehicle wheel alignment system that the vehicle undergoing an alignment procedure is altered, customized, or otherwise in a non-standard configuration, the vehicle wheel alignment system display 300 is configured to provide the operator with a set of options associated with the alignment of the vehicle, as shown in FIG. 4. These options may include the selection buttons 304A, 304B corresponding one or more optional vehicle measurements (Box 206), and section buttons 306A, 306B, corresponding to a vehicle characteristic which is to be optimized during the alignment procedure (Box 208). Optional vehicle measurement procedures which an operator may select using the selection buttons 304 may include a bump steer measurement procedure, and a vehicle weight distribution measurement procedure (Box 210).

Vehicle characteristics which may be selected for optimization using selection buttons 306 during the vehicle wheel alignment procedure include tire life and vehicle performance. Those of ordinary skill in the art will recognize that the vehicle wheel alignment system may be programmed to provide an operator with different or additional choices for optional vehicle measurement procedures, and different or additional choices for optimization of vehicle characteristics through the alignment procedure. The optional measurements of bump steer and vehicle weight distribution, and the choices of optimizing tire life or vehicle handling are exemplary, and are not intended as limiting.

If the operator selects an optional vehicle measurement procedure, such as bump steer or vehicle weight distribution, the vehicle wheel alignment system is configured to guide the operator through the selected optional vehicle measurement procedure (Box 212A, 212B), and to record and/or display the resulting measurements (Box 214A, 214B). For some optional procedures, such as the bump steer procedure which permits the operator to observe variations in each of the vehicle steered wheel toe angles when the vehicle wheels are raised and lowered, simulating transit over a bump in the road, it may be necessary to acquire vehicle wheel alignment measurements in a conventional manner. The process of guiding the operator through the selected optional vehicle measurement procedures may be repeated as required until all optional vehicle measurement procedures selected by the operator have been carried out. (Box 216). Measurement results from the optional vehicle measurement procedures may be stored in the vehicle alignment system for subsequent use.

For example, the operator may elect to perform a bump steer measurement if the vehicle has been known to exhibit a pull to one side or another when driving over bumpy road surfaces. Bump steer effects are generally caused by a misalignment of the vehicle steering rack or steering system components, resulting in a change in the vehicle wheel alignment angles on each steered vehicle wheel when the wheels are raised or lowered. Misalignment of the vehicle steering rack or steering system components is a common occurrence in vehicles having a modified suspension system. Accordingly, the bump steer measurement procedure may be utilized as a diagnostic tool to provide guidance to the operator to check the level or configuration of the vehicle's steering rack or steering system components before proceeding further with the vehicle alignment measurement and alterations. If the geometry of the steering system results in a bump steer condition, the solution, depending upon the vehicle type and/or steering system components, is to either shim one or both of the steering tie rods or to re-position the steering rack itself.

Figure 5:
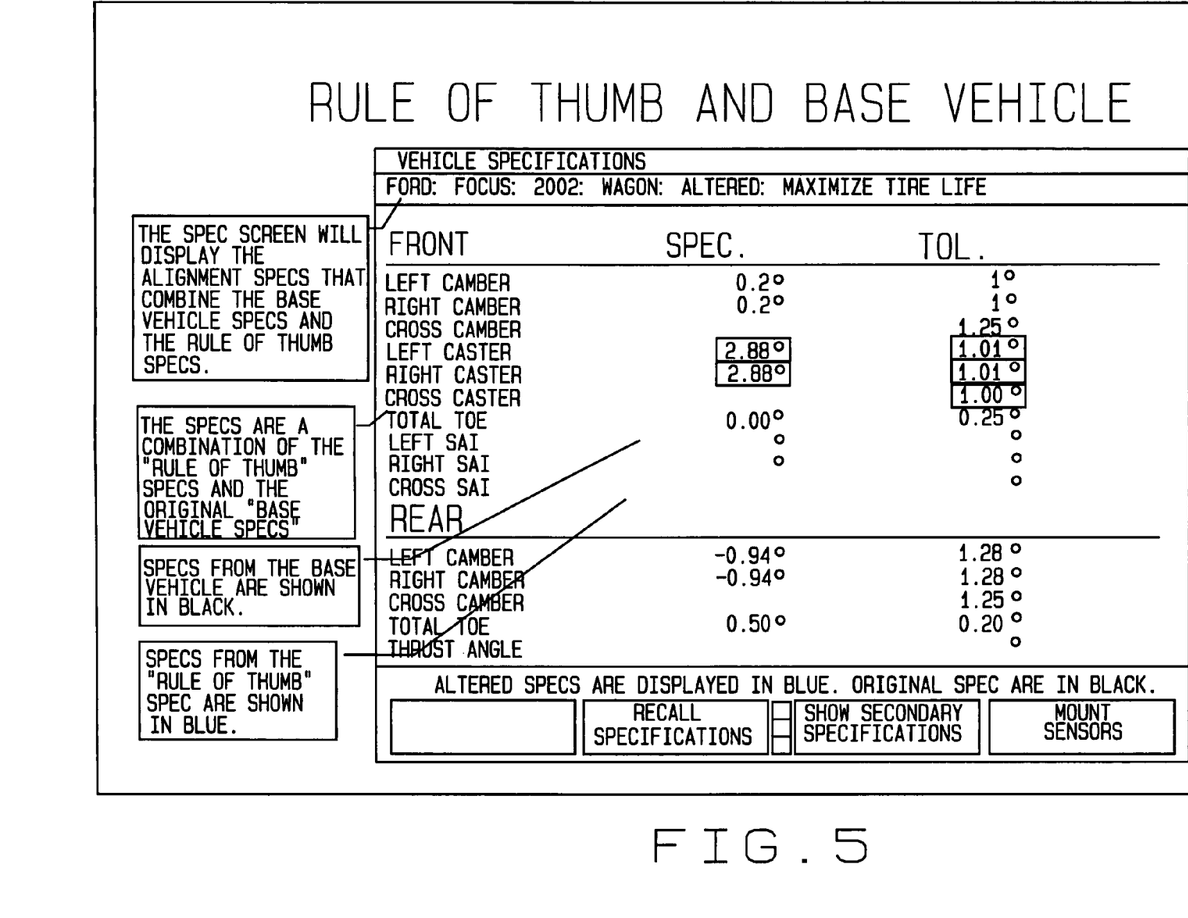
FIG. 5 is a representative display of a set of guideline alignment values generated by the vehicle wheel alignment system in response to the selection of a vehicle characteristic for optimizations.

Upon completion of all selected optional vehicle measurement procedures, and upon selection of a vehicle characteristic to optimize during the alignment procedure (Box 208), the vehicle wheel alignment system display 300 presents the operator with a set of guideline alignment values. (Box 218). As shown in FIG. 5, the set of guideline alignment values provide baseline alignment specifications for traditional vehicle wheel alignment angles, including camber, caster, toe, SAI, and the vehicle thrust line. The set of guideline alignment values is preferably initially established by the vehicle wheel alignment system utilizing the set of manufacturer's baseline wheel alignment values for the identified vehicle, combined with a set of "rule of thumb" alignment values, baseline alignment values, or operator selected alignment values associated with the selected vehicle characteristic selected for optimization by the operator. Optionally, the measurement results from any optional vehicle measurements procedures may be utilized to further modify the set of guideline alignment values prior to display to the operator.

If not previously carried out in connection with an optional vehicle measurement procedure, conventional vehicle wheel alignment angle measurement components or sensors are configured in a conventional manner to acquire current measurements of the vehicle wheel alignment angle. Configuration of conventional vehicle wheel alignment measurement components or sensors may include the mounting of measurement transducers or targets to the vehicle wheels, and the compensation of any such mounted components for runout. Measurements of the vehicle's current alignment angles are then acquired and stored (Box 220) in a conventional manner by the vehicle wheel alignment system.

Once the vehicle's current alignment angle measurements are acquired, the vehicle wheel alignment system compares the current alignment angle measurements with the previously established set of guideline alignment values, and guides the operator to make the necessary adjustments to the vehicle such that the vehicle alignment conforms to the guideline alignment values. (Box 222). Alignment of the vehicle to the guideline alignment values is carried out in a conventional manner as if the vehicle were being aligned to a set of manufacturer specified alignment angle values. The specific steps and procedures may vary from vehicle to vehicle, as is well understood to those of ordinary skill in the art of vehicle wheel alignment.

Figure 6:
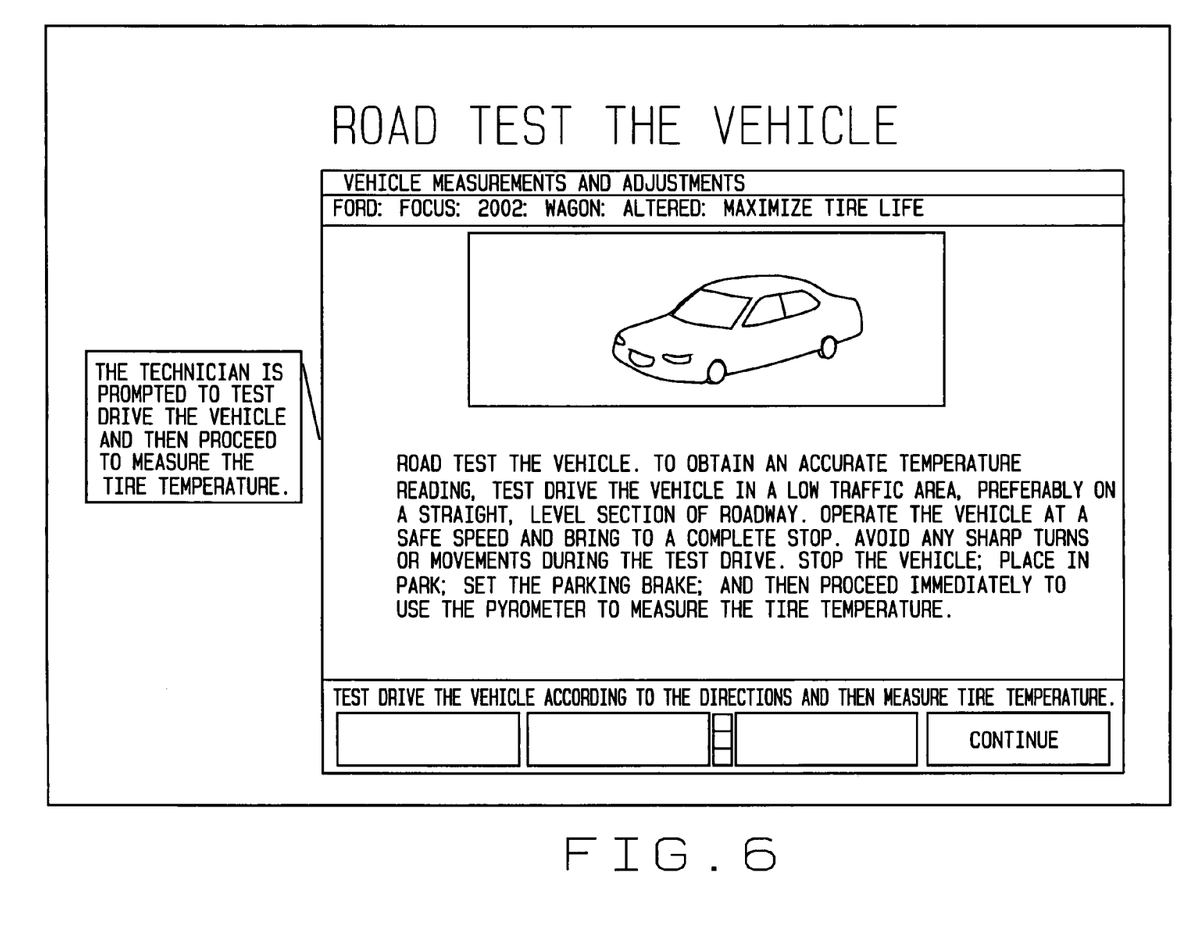
FIG. 6 is a representative display of a vehicle road test instructions screen.

Once the vehicle has been successfully aligned to the guideline alignment values, the vehicle wheel alignment system instructs the operator to carry out a road-test of the vehicle, as shown in FIG. 6. During the road test (Box 224), it is preferable that the operator drive the vehicle in a predetermined and repeatable manner, to enable accurate measurements to be taken which are related to the particular selected characteristic for which the alignment is being optimized. For example, to obtain measurements suitable for determining if the alignment is optimized for maximum tire life, it is preferable that the vehicle be driven on a straight, level section of road, avoiding sharp turns or movements. To obtain measurements suitable for determining if the alignment is optimized for vehicle handling, such as might be encountered during competitive driving, it is preferable that the vehicle be driven in a different manner, which more closely represents the actual conditions that would be encountered during the vehicle's expected use, i.e., a competition. This may consist of performing skid pad tests, slalom tests, or driving on a circuit representative of that encountered in an actual competition event.

Upon completion of the road test, the operator is presented with the choice of either further adjusting the vehicle wheel alignment, or optionally, keeping the vehicle alignment at the current settings. (Box 226). If further adjustments are desired, one or more measurements of the vehicle, which are related to the selected vehicle characteristic being optimized, are acquired (Box 228). In a preferred embodiment of the present invention, the measurements of the vehicle consist of one or more sets of tire temperature measurements (Box 226) which are acquired promptly following the road test, before the tire temperature returns to an ambient temperature. The tire temperature measurements may be acquired with any conventional temperature measurement devices suitably configured for measurements in the range commonly found on vehicle tires. For example, the temperature measurements may be acquired by use of a thermal imaging device, a direct contact thermal probe, or infrared non-contact pyrometer such as the Model No. 50686/90 Memory Pyrometer from Longacre Racing Products of Woodinville, Wash.

Figure 7:
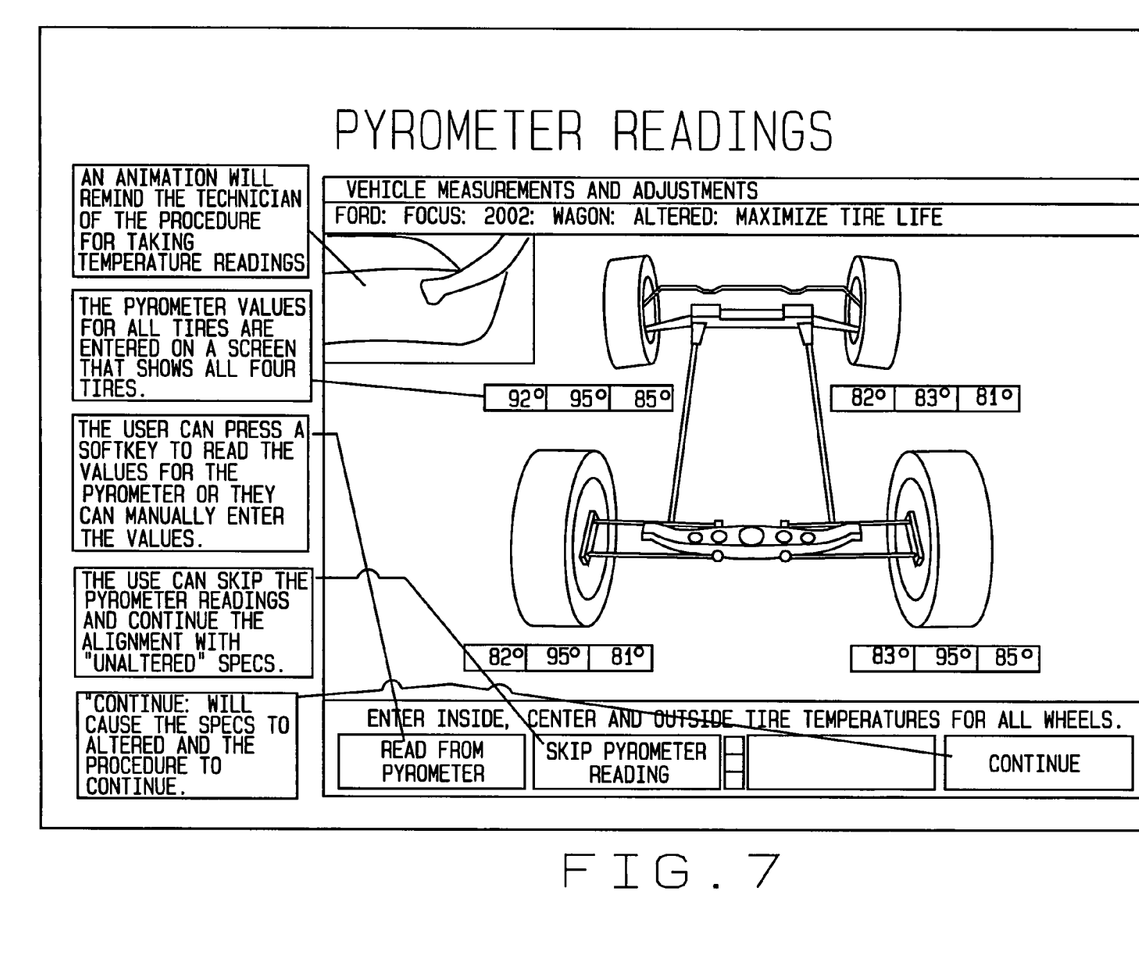
FIG. 7 is a representative display of a tire temperature measurements screen.

Preferably, as shown in FIG. 7, tire temperature measurements are acquired for three positions on each tire of the vehicle, the outer tread surface, the center tread surface, and the inner tread surface. The tire temperature measurements may be communicated automatically to the vehicle wheel alignment system through any suitable conventional electronic interface between the vehicle wheel alignment system and the tire temperature measurement device, or may be entered manually by an operator. Once the tire temperature measurements are received at the vehicle wheel alignment system, they are stored and displayed for operator review.

Using the tire temperature measurements, the vehicle wheel alignment system is configured to alter the guideline alignment values using predetermined relationships between tire temperatures and vehicle wheel alignment angles (Box 232). For example, if tire temperatures on the inside (or outside) tread surface of both tires on an axle are greater than the tire temperatures elsewhere on the tread surfaces, the vehicle wheel alignment system may be configured to alter either the toe or camber guideline alignment values for the associated vehicle wheels. If the temperature on only one tire on an axle is greater on either an inner or outer tread surface than elsewhere on the tire tread surface, the vehicle wheel alignment system may be configured to alter the camber guideline alignment value for the associated vehicle wheel. If the tire temperatures for a tire tread surface are uniform across the tread surface to within a predetermined tolerance, the guideline alignment value for that vehicle wheel is considered to be optimal, and preferably remains unchanged.

Figure 8:
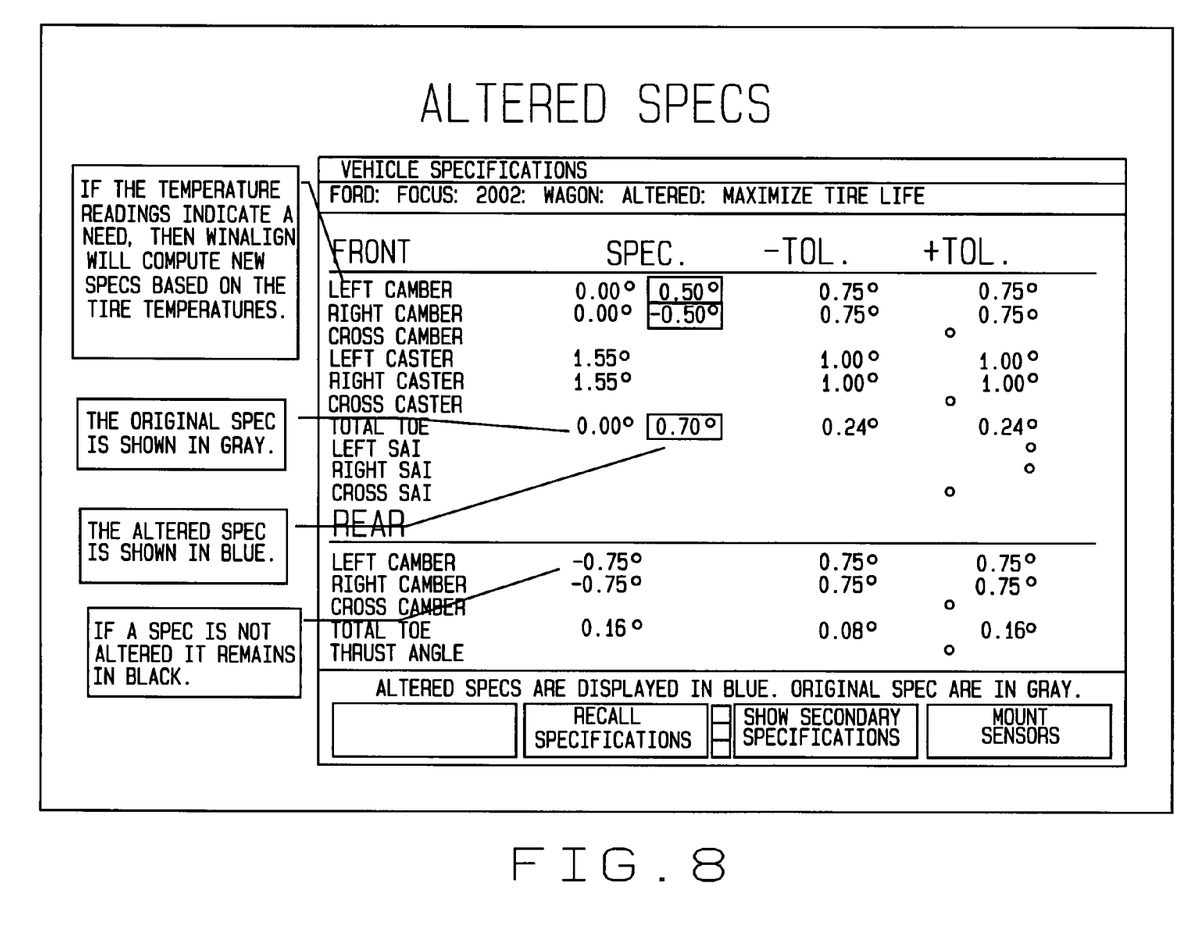
FIG. 8 is a representative display of an altered set of guideline alignment values following a vehicle road test and characteristic measurement procedure.

Once the vehicle wheel alignment system has identified a new or altered set of guideline alignment values, these values are displayed to the operator, as shown in FIG. 8, and the vehicle wheel alignment adjustment process is repeated, aligning the vehicle to the new or altered set of guideline alignment values. This process of aligning the vehicle, road testing the vehicle, acquiring additional measurements, and altering the guideline alignment values (Box 236) is repeated either until the measured tire temperatures on each tire are uniform to within the predetermined tolerance across the associated tread surface, or until the operator elects to terminate the alignment procedure (Box 234).

Figure 9:
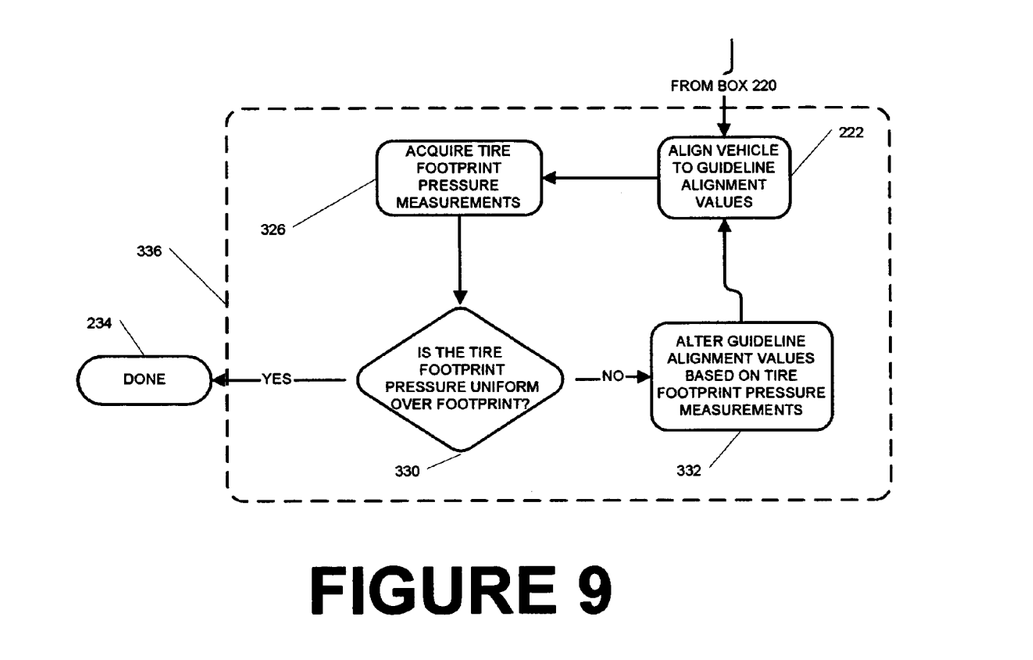
FIG. 9 is a partial flow chart of an alternate method of the present invention.

In an alternate embodiment of the present invention, a measurement of tire footprint pressure is substituted for the measurement of tire tread temperatures. The steps associated with the tire tread temperature measurements (Box 236), are replaced as shown in FIG. 9, by a new set of procedures associated with the measurement of the tire footprint pressure. Following the measurement and storage of the initial vehicle wheel alignment values (Box 220), the vehicle is aligned to the first set of guideline alignment values identified by the vehicle wheel alignment system (Box 222). Next, instead of conducting a road test of the vehicle, followed by measurement of the tire tread temperatures, the operator measures the tire footprint pressure (Box 326) for each tire of the vehicle.

Tire footprint pressure measurements for each vehicle tire may be acquired using any of a variety of pressure measurement devices having sufficient size, sensitivity, and resolution to provide an accurate measurement of the tire footprint pressure across the tire footprint, i.e., across the portion of the tire in contact with the surface on which the tire rolls. A suitable tire footprint pressure measurement device is the Tire-Scan system from Tekscan, Inc. of South Boston, Mass., which is capable of providing both static and dynamic tire footprint pressure measurements.

Assuming the operator desires to further continue the alignment process, the tire footprint pressure measurement data is utilized to determine if further alterations to the guideline alignment values will improve the selected vehicle characteristic (Box 330). For example, if a tire footprint pressure for a particular tire is non-uniform, i.e., higher on either an inner or outer edge of the tire footprint, the vehicle wheel alignment system may be configured to alter a camber guideline alignment value for that vehicle wheel. If the tire footprint pressure measurements suggest further alterations to the guideline alignment values, the guideline alignment values are altered (Box 332), and represented to the operator. The cyclical process (Box 336) of alignment, measurement, and alteration of guideline values is repeated until either the operator terminates the alignment procedure or the tire footprint pressure measurements are found to be uniform for each tire of the vehicle following an alignment adjustment.

Figures 10A, 10C:
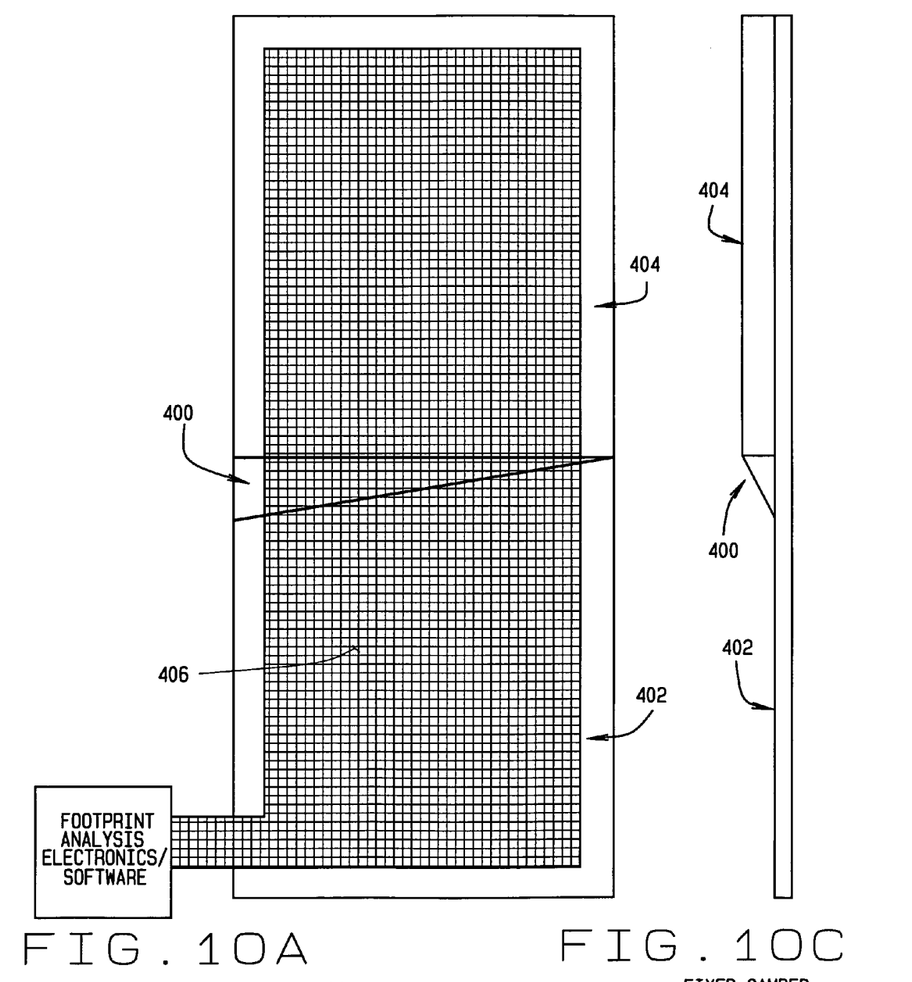
FIG. 10A is a top plan view of a tire footprint pressure measurement system including a predetermined camber change surface.
FIG. 10C is a side view of the tire footprint pressure measurement system of FIG. 10A.
Figure 10B:
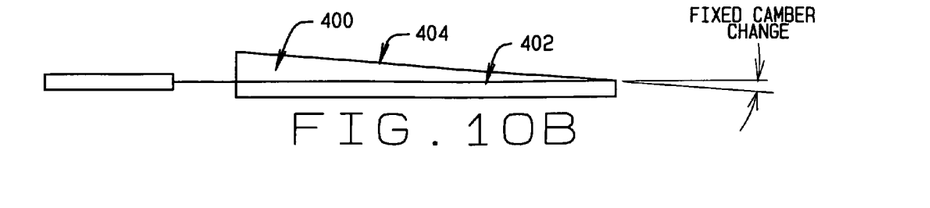
FIG. 10B is an end view of the tire footprint pressure measurement system of FIG. 10A.

In one embodiment of the present invention, the measurement of the tire footprint pressure for each vehicle tire is acquired with the vehicle stationary. However, in an alternate embodiment of the present invention, a dynamic, i.e. rolling, measure of tire footprint pressure for each vehicle tire is utilized in the process of the present invention. Additional information associated with the selected vehicle characteristic and current vehicle alignment settings may be obtained by measuring the dynamic tire footprint pressure for each vehicle tire as the tire is rolled over an angled incline, introducing a predetermined motion to the vehicle suspension system. As shown in FIGS. 10A, 10B, and 10C, an angled incline 400 transitioning between a level surface 402 and an inclined surface 404 below a tire footprint pressure sensor device 406 forces the vehicle suspension system to transition between a first state and a second state by causing the vehicle tire rolling over the sensor device 406 to experience a change in loading similar to that which would be expected if the camber angle had been changed a similar amount. This change in tire contact pressure or loading provides additional information utilized to determine if an alteration of the guideline alignment value would improve the selected vehicle characteristic.

By determining how the pressure gradient varies with the apparent change in camber due to the surfaces that are inclined relative to each other, it is possible to predict the amount of camber change that is required to minimize the pressure distribution across the tread width. Further, it is possible to predict the actual measurement of camber using these relative measurements of pressure gradients and comparing them to the gradient seen with the tire on a surface inclined a known amount (preferably level).

Figure 11:
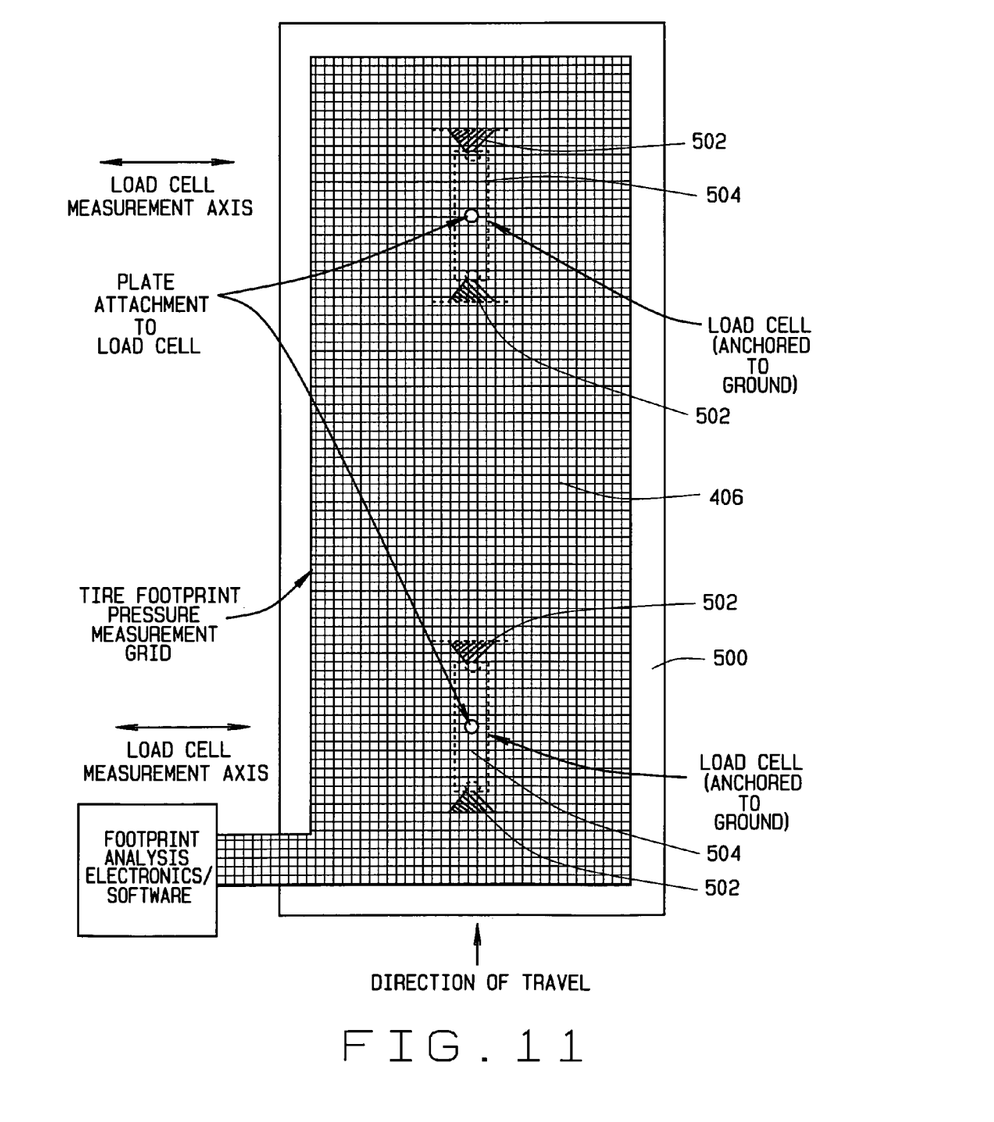
FIG. 11 is a top plan view of a tire footprint pressure measurement system adapted for measurement of tire lateral force.

In an alternate embodiment of the present invention, tire lateral force measurements are acquired in conjunction with dynamic tire footprint pressure measurements to determine if an alteration of the guideline alignment value would improve the selected vehicle characteristic. As shown in FIG. 11, the tire footprint pressure measurement device 406 is disposed on a substructure 500 secured to a stationary surface 502, such as the ground, with one or more load cells 504 each configured to measure lateral force. The measure of lateral force acquired during the measurement of dynamic tire footprint pressure for each vehicle tire provides supplemental information utilized to determine if an alteration of the guideline alignment value would improve the selected vehicle characteristic. The lateral force measurement can be used as in a conventional sideslip meter where force in one direction indicates a wheel toe-in condition, and force in the other direction indicates a wheel toe-out condition. In a system configured with two load cells separated by some distance, loads in opposite directions indicate that a torsional load is being transmitted between the tire and the measuring device, in the plane of the contact patch. This loading may indicate a ply-steer condition, tire conicity, or excessive camber. All of these measurements can be used to predict the alignment of a vehicle. Comparison of these predicted measurements to actual condition of the vehicle as determined by the conventional alignment system provides a method of identifying potential problems that may could cause undesired vehicle handling characteristics that are unrelated to wheel alignment. For example, tire conicity could result in the system outlined above (where the measured pressure distribution of the contact patch is used to predict camber) suggesting a camber value somewhat different than that of the conventional alignment measurement means. In cases where the conventional alignment measurements and the predicted alignment measurements do not agree to within a predetermined amount, the operator is be prompted to perform further inspections or procedures to attempt to determine the cause of the discrepancy.

Those of ordinary skill in the art will readily recognize that the various embodiments of the present invention set forth herein are not mutually exclusive, and that a variety of measurements which provide information associated with the selected vehicle characteristic may be utilized in conjunction to determine if an alteration of the guideline alignment value would improve the selected vehicle characteristic. For example, following an alignment, the vehicle may be road tested, and tire temperature measurements taken. Subsequently, tire footprint pressure measurements may be taken to either confirm any changes suggested based on the tire temperature measurements, or to provide supplemental information used to determine the amount, if any, by which the guideline alignment values will be altered.

Those of ordinary skill in the art will recognize that tire temperature measurements and tire footprint pressure measurements may be affected by the inflation level of the vehicle tires. Accordingly, in an alternate embodiment of the present invention, the vehicle wheel alignment system is configured to instruct the operator to check the inflation level of each tire, and to adjust the inflation level to the manufacturers specified values prior to beginning the alignment measurements. Optionally, the inflation level of each tire may be input to the vehicle wheel alignment system automatically, such as from a remote tire pressure sensor, or manually by the operator, and the inflation levels utilized in the process of determining the guideline alignment values.

Additionally, the tire temperature variation and/or contact patch pressure variation across the width of a tire can be used to check for proper inflation pressures. The temperature measured at the center of the tire tread surface should be approximately the average of the temperatures measured on the inboard and outboard positions on the tread surface. A center temperature lower than the average suggests that the tire is under inflated whereas a higher reading indicates over inflation. Likewise, a contact patch that shows a pressure at the center of the tread that is lower or higher than the average of the inner and outer pressures indicates an under inflation or over inflation condition. This is information is of particular value on vehicles that have been fitted with tires having sizes differing from those specified by the manufacturer.

The present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or an other computer readable storage medium, wherein, when the computer program code is loaded into, and executed by, an electronic device such as a computer, micro-processor or logic circuit, the device becomes an apparatus for practicing the invention.

The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented in a general-purpose microprocessor, the computer program code segments configure the microprocessor to create specific logic circuits.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

The invention claimed is:

1. A method for use with a vehicle wheel alignment system for adjusting the alignment of a vehicle to alter at least one vehicle characteristic, comprising:
   selecting a desired characteristic of the vehicle for which the vehicle alignment is to be altered;
   providing a set of guideline alignment settings based in-part upon said selected characteristic for the vehicle;
   aligning the vehicle to said guideline alignment settings;
   testing the vehicle in a predetermined manner associated with said selected characteristic;
   subsequent to said test, acquiring data relevant to said selected characteristic; and
   evaluating said data to determine if additional alignment adjustments would further improve said selected characteristic.

2. The method of claim 1 for adjusting the alignment of a vehicle wherein said data includes at least one measurement of said vehicle related to said selected characteristic.

3. The method of claim 1 for adjusting the alignment of a vehicle wherein said data includes operator feedback.

4. The method of claim 1 for adjusting the alignment of a vehicle further including the step of providing vehicle identifying information prior to selecting a desired characteristic; and
   wherein said set of guideline alignment settings are further based in-part on said provided vehicle identifying information.

5. The method of claim 1 for adjusting the alignment of a vehicle wherein the step of acquiring at least one measurement of the vehicle includes acquiring at least one tire tread surface temperature measurement.

6. The method of claim 5 for adjusting the alignment of a vehicle wherein the step of acquiring at least one measurement of the vehicle includes acquiring at least one set of tire tread surface temperature measurements from at least one vehicle tire.

7. The method of claim 6 for adjusting the alignment of a vehicle wherein said at least one set of tire temperature measurements includes at least one measurement from an outer edge of a tire tread surface, at least one measurement from a middle region of said tire tread surface, and at least one measurement from an inner edge of said tire tread surface.

8. The method of claim 1 for adjusting the alignment of a vehicle further including the steps of measuring a tire inflation level for each vehicle tire; and
   altering a tire inflation level to be within a predetermined range of acceptable tire inflation values for each vehicle tire having a measured tire inflation level outside of said predetermined range.

9. The method of claim 1 for adjusting the alignment of a vehicle wherein the step of acquiring at least one measurement of the vehicle includes acquiring at least one tire footprint pressure measurement.

10. The method of claim 9 for adjusting the alignment of a vehicle wherein said at least one tire footprint pressure measurement is a static measurement.

11. The method of claim 9 for adjusting the alignment of a vehicle wherein said at least one tire footprint pressure measurement is a dynamic measurement.

12. The method of claim 1 for adjusting the alignment of a vehicle wherein the step of acquiring at least one measurement of the vehicle includes acquiring at least one tire lateral force measurement.

13. The method of claim 1 for adjusting the alignment of a vehicle wherein each of said altered values in said guideline alignment settings is based on said at least one measurement, a corresponding guideline value from an immediately prior iteration, and a predetermined alignment alteration guideline.

14. The method of claim 1 for adjusting the alignment of a vehicle further including the step of acquiring one or more preliminary measurements associated with said vehicle prior to providing said set of guideline alignment settings; and
   wherein said set of guideline alignment settings are further based in-part upon said one or more preliminary measurements.

15. The method of claim 14 for adjusting the alignment of a vehicle wherein said one or more preliminary measurements include at least one bump steer measurement.

16. The method of claim 14 for adjusting the alignment of a vehicle further including the step of adjusting one or more vehicle components responsive to said one or more preliminary measurements prior to the step of aligning the vehicle.

17. The method of claim 16 for adjusting the alignment of a vehicle wherein said step of adjusting one or more vehicle components includes the step of leveling one or more vehicle steering system components.

18. The method of claim 14 for adjusting the alignment of a vehicle wherein said one or more preliminary measurements include at least one tire wear measurement.

19. The method of claim 14 for adjusting the alignment of a vehicle wherein said one or more preliminary measurements include at least one tire tread depth measurement.

20. The method of claim 14 for adjusting the alignment of a vehicle wherein said one or more preliminary measurements include at least one wheel lateral force measurement.

21. A method for use with a vehicle wheel alignment system for adjusting the alignment of a vehicle to alter at least one vehicle characteristic, comprising:
   selecting a desired characteristic of the vehicle for which the vehicle alignment is to be altered;
   providing a set of guideline alignment settings based in-part upon said selected characteristic for the vehicle;
   aligning the vehicle to said guideline alignment settings;
   testing the vehicle in a predetermined manner associated with said selected characteristic;
   subsequent to said test, acquiring data relevant to said selected characteristic;
   evaluating said data to determine if additional alignment adjustments would improve said selected characteristic; and
   responsive to said evaluation indicating additional alignment adjustments would improve said selected characteristic, replacing at least one guideline alignment setting in said guideline alignment settings with an altered value and repeating the step of aligning.

22. The method of claim 21 for adjusting the alignment of a vehicle further including repeating the steps of testing, acquiring, and evaluating.

23. A method for use with a vehicle wheel alignment system for adjusting the alignment of a vehicle to alter at least one vehicle characteristic, comprising:
   selecting a desired characteristic of the vehicle for which the vehicle alignment is to be altered;
   providing a set of guideline alignment settings based in-part upon said selected characteristic for the vehicle;
   aligning the vehicle to said guideline alignment settings;
   testing the vehicle in a predetermined manner associated with said selected characteristic;

subsequent to said test, acquiring data relevant to said selected characteristic including at least one dynamic tire footprint pressure measurement for a vehicle tire associated with a predetermined change in a vehicle suspension angle associated with said vehicle tire; and evaluating said data to determine if additional alignment adjustments would further improve said selected characteristic.

24. The method of claim 23 for adjusting the alignment of a vehicle wherein said predetermined change in a vehicle suspension angle is a camber change.

25. An improved vehicle wheel alignment system having at least one sensor for acquiring vehicle wheel alignment data, a computer configured with a vehicle wheel alignment software program for calculating vehicle wheel alignment values for one or more vehicle wheels from the acquired vehicle wheel alignment data, and a display operatively coupled to the computer for displaying the calculated vehicle wheel alignment parameters, the improvement comprising:

the computer configured with said vehicle wheel alignment software program including a first set of program instructions for receiving data associated with at least one selected characteristic of the vehicle, said data including one or more measurements selected from a set of measurements including tire tread temperature measurements, static tire footprint pressure measurements, dynamic tire footprint pressure measurements, and tire lateral force measurements;

the computer configured with said vehicle wheel alignment software program including a second set of program instructions for generating at least one set of guideline alignment parameters for the vehicle based on said at least one selected characteristic; and the computer configured with said vehicle wheel alignment software program including a third set of program instructions for guiding a technician to alter the alignment of a vehicle utilizing said generated guideline alignment parameters.

26. The improved vehicle wheel alignment system of claim 25 wherein said computer is configured with said vehicle wheel alignment software program for optionally altering one or more guideline alignment values for a vehicle in response to at least said received data.

27. The improved vehicle wheel alignment system of claim 25 wherein said at least one set of guideline alignment parameters includes a set of alignment angle values.

* * * * *